Patented Oct. 22, 1935

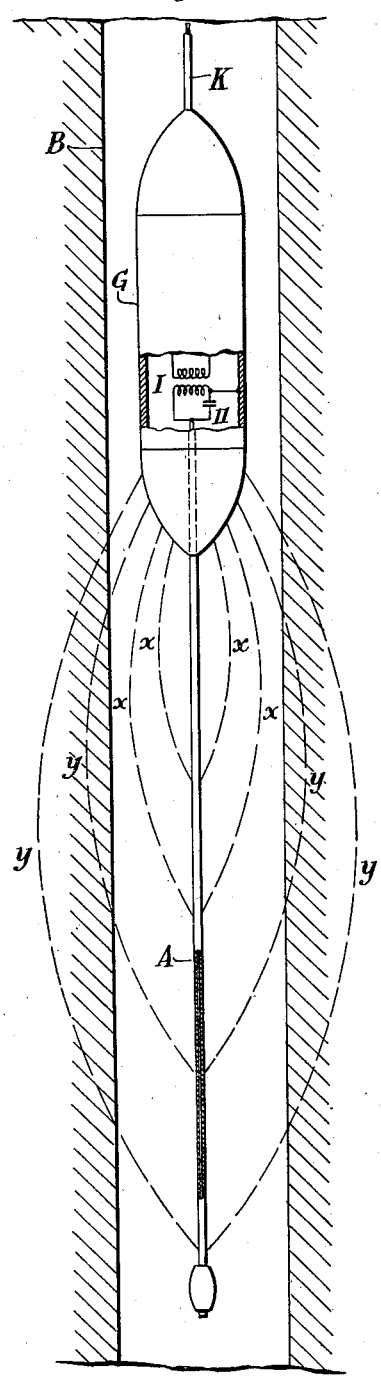
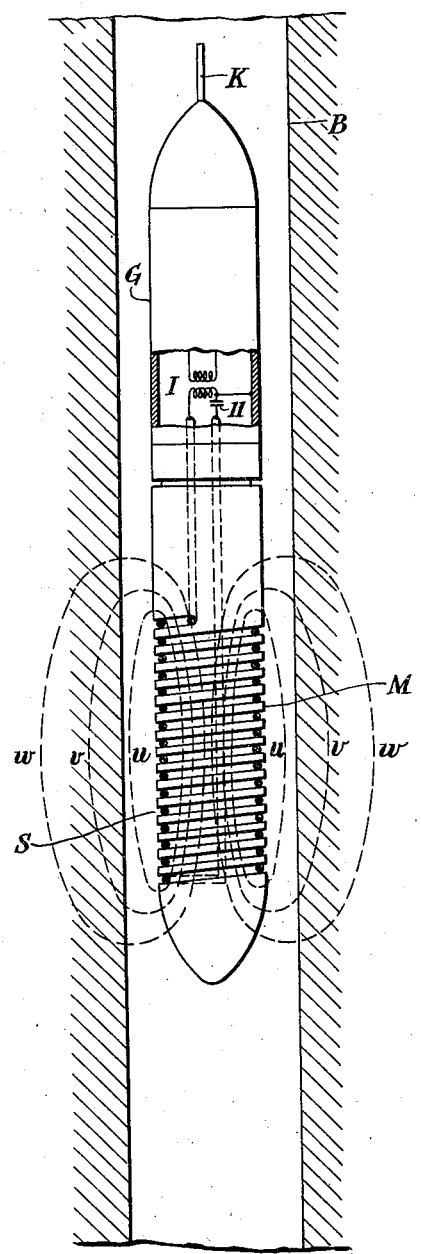

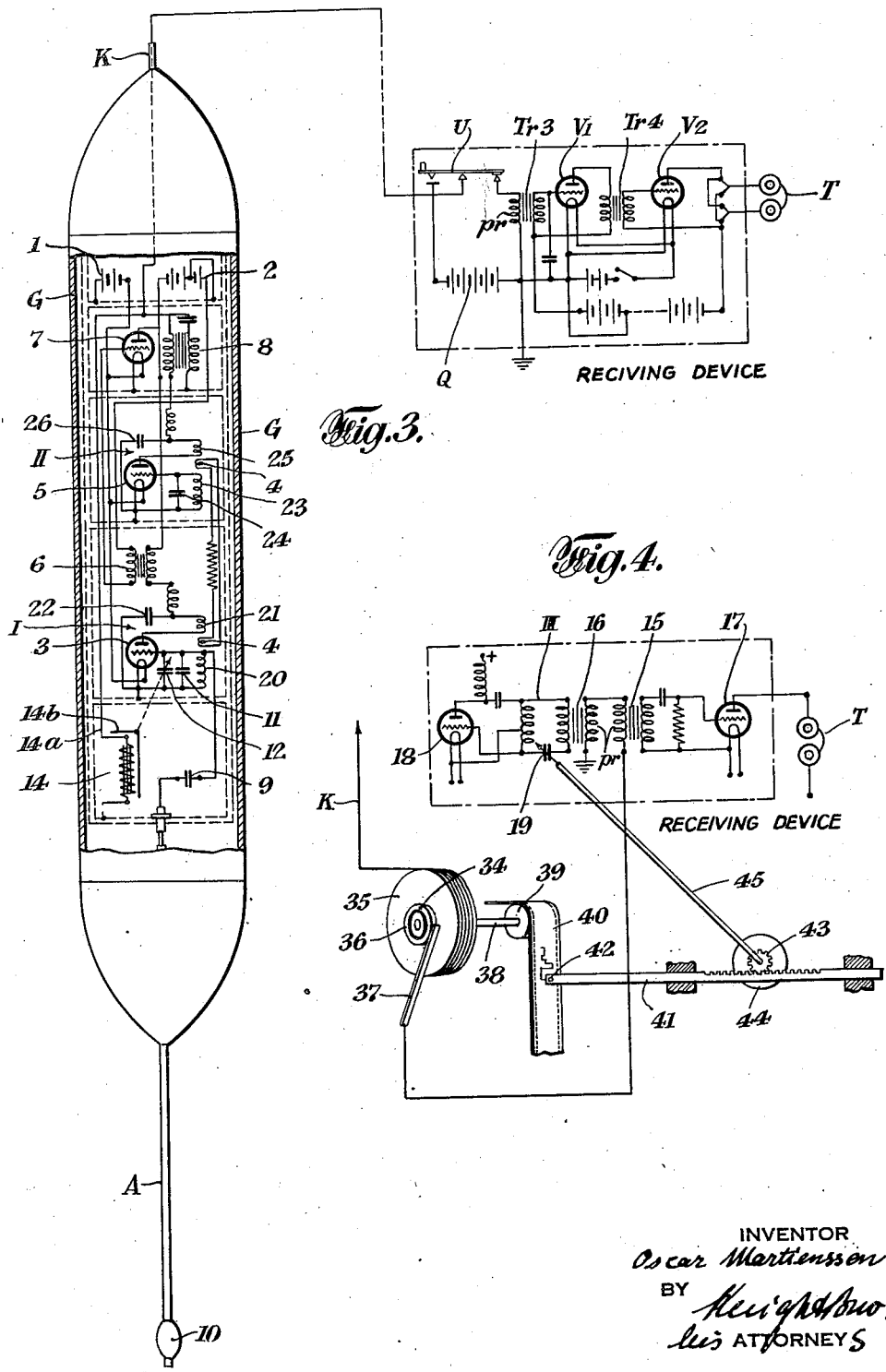

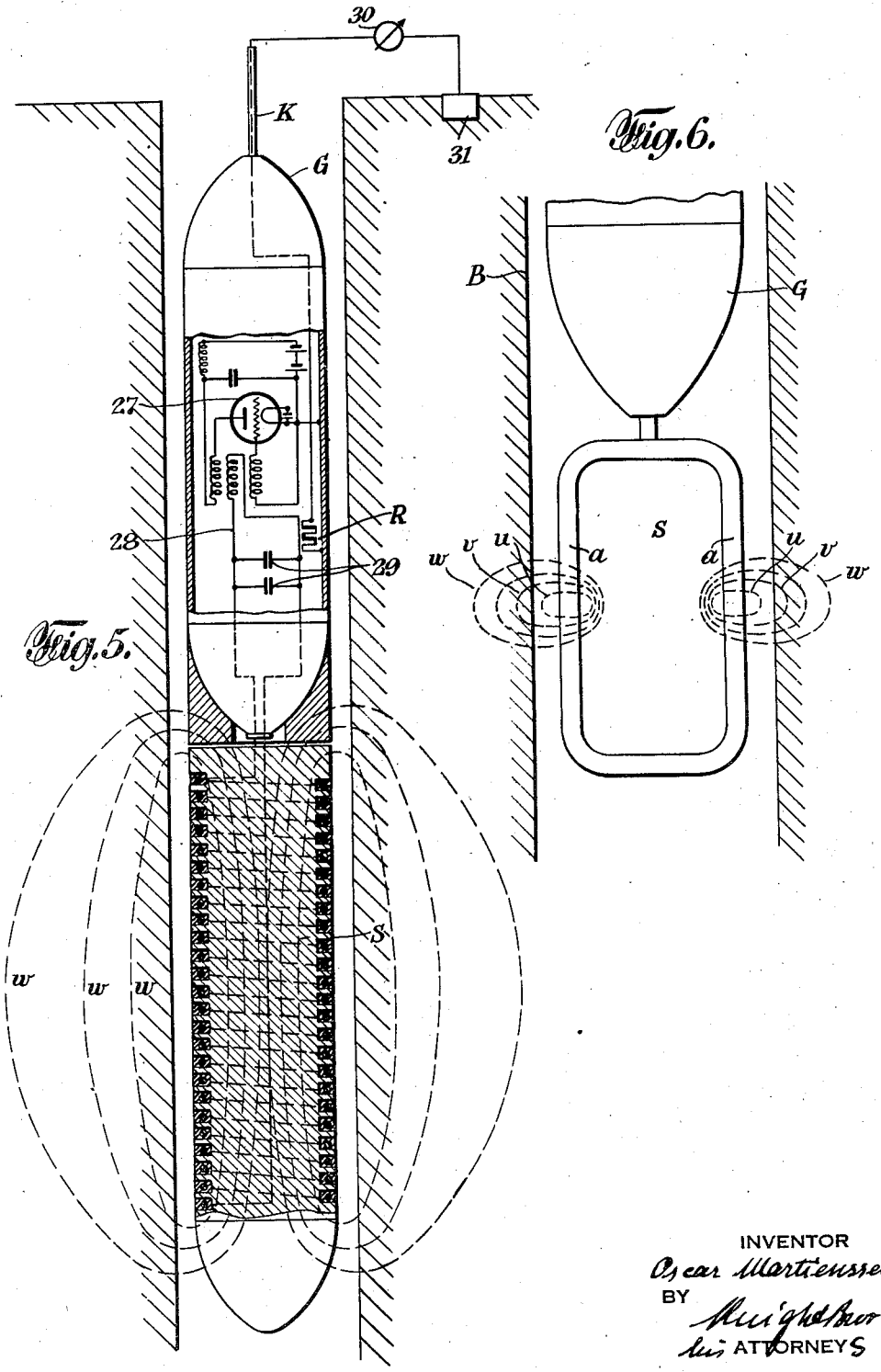

2,018,080

UNITED STATES PATENT OFFICE 2,018,080

METHOD OF AND DEVICE FOR DIFFERENTIATING BETWEEN GEOLOGIC STRATA TRAVERSED BY BORE HOLES

Oscar Martienssen, Kiel, Germany

Application May 31, 1935, Serial No. 24,226
In Germany July 9, 1934

15 Claims. (Cl. 175—182)

In carrying out geophysical measuring methods for investigating geologic strata, and for discovering minerals, the different physical properties of the strata are utilized. For instance with the seismic method the different speeds of sound in different strata are utilized, with the torsion balance method the different specific weights of the different strata are utilized, with the resistance method the different electric conductivity of the strata is used, and with the high frequency method the influence of the specific resistance and of the dielectric constants of the strata upon a circuit is utilized in which high frequency current is generated.

These different methods have been only moderately successful for ascertaining the character of the different media contained in the different strata with measurements for which the observations are carried out above ground. These methods are fairly successful where the media are comparatively accessible, such as in mine tunnels, or the like.

So far as I am aware these methods have not been successful in inaccessible places, such as bore holes which are usually filled with liquid. So far as I am aware only the resistance method of Schlumberger has been developed in a manner to render its use possible in a bore hole. Its inherent characteristic, however, is such that it must fail in case the specific resistance of the traversed strata does not constitute a sufficient characteristic feature for the media contained in the strata.

The present invention deals with a method and an apparatus which renders the use of the high frequency method possible in a bore hole under all existing conditions.

The principal difficulty in utilizing the high frequency method in a bore hole resides in the fact that it is not possible—without impairing the correctness of the measurements—to carry the high frequency currents by means of a cable from the point of exploration below ground to the point of observation above ground. It is quite apparent that if such high frequency currents were conducted through a cable which is above ground wound on and unwound from a drum, the change in self induction and capacity of this cable during the winding and unwinding process would have an influence upon the high frequency circuit far in excess of the influence which the medium of the stratum at the point of exploration may have upon the circuit, so that the latter influence would be completely masked by the varying self induction and capacity of the cable.

Therefore, as one of the principal features of the present invention I propose to place the entire high frequency circuit below ground, and confine it to the location where the exploration is to be made, and to indicate the effect of the adjacent media upon the circuit above ground indirectly, i. e. by electric forces responsive to the variations in the circuit due to these effects and which forces themselves are are not affected by the varying length of the cable in raising and lowering the detecting device in the bore hole, and which also are non-reactive upon the high frequency circuit.

A further important feature of my invention is that the entire high frequency circuit to be affected by the medium investigated has a longitudinal extension of only a few meters so that even a stratum of only a few meters thickness is capable of exerting a measurable influence upon the exploring device. The prior art has proposed to avoid the difficulty of conducting a high frequency current from the point of exploration through the cable to the point of observation by confining the high frequency circuit to the apparatus portion which is located above ground, and to connect to this high frequency circuit an antenna which is lowered and raised in the bore hole, so that by the variation of capacity of this antenna or by the incident damping of the high frequency circuit the character of the different strata would be determined. Such a method is, however, impractical in deep bore holes, especially if they are filled with water or if they are even partly lined with piping. The reasons for the failure of such a method are the following:

First, the variation in self induction and capacity of the antenna when rolled off a drum, and lowered into the bore hole affects the oscillation circuit much more than the adjacent geologic strata.

Second, the influence of strata of only a few meter thickness, for instance consisting of oil carrying sands, becomes almost infinitesimal with a very long antenna.

Third, the capacity of an antenna of for instance 1,000 meter length—which is not an unusual depth of a bore hole—and in case the hole is filled with water and partly lined with piping, is so great that natural oscillations of sufficiently high frequency cannot be produced.

All these disadvantages are overcome by my novel method and device.

My invention is illustrated in the accompanying drawings in which—

Figs. 1 and 2 represent diagrams illustrating two operating principles on which the invention is based.

Fig. 3 represents a diagram of the circuit arrangements of the device for carrying out the observation according to the principle shown in Fig. 1.

Fig. 4 represents a circuit diagram of a modified tone receiver above ground permitting aural observations and recording of the circuit variations necessary to maintain the tone observations constant.

Fig. 5 represents a modified form of transmission of the varying high frequency effects by means of a thermo cell, and Fig. 6 represents a modified form of the inductance coil S of Fig. 2.

The effect upon the high frequency circuit by an adjacent stratum can be obtained in different ways. For instance, as shown in Fig. 1, G may represent a housing capable of withstanding high pressures which is lowered into the bore hole B by means of a cable K. In housing G is located a high frequency circuit I in which high frequency currents may be produced in any suitable manner, to be described later on. The condenser 11 of this oscillatory circuit is at one terminal connected with the conducting housing G which in turn is connected to ground by means of the liquid which is practically always contained in the bore hole. The other terminal of condenser 11 is connected to the antenna A which consists of a wire insulated throughout its whole length, including its end and the portion which passes through the housing G. This antenna represents a capacity which is electrically in parallel to condenser 11, and is thus by its variation capable of affecting the frequency of the oscillatory circuit. The capacity of this antenna in turn is varied by the properties of the adjacent strata which the device traverses. Some of the electrostatic lines of force which form between the different points of the antenna and the housing G would traverse only the water in the bore hole, such as the lines $x, x$, in Fig. 1. The far greater number of lines such as $y, y$ will, however, traverse the adjacent geologic stratum.

Since the dielectric constant of water is about 80, and that of for instance sand stone or similar geologic formations is from 6 to 8, and the constant of raw oil is approximately only 2, it follows that the capacity of the antenna may be very strongly influenced by the dielectric constant of the adjacent stratum. If the stratum consists of for instance water-saturated sand the capacity will be very great. If the stratum consists of oil-saturated sand the capacity will be very small.

Thus, when the apparatus traverses the bore hole the capacity of the antenna and thus the frequency of the oscillatory circuit in the housing G will vary in accordance with the character of the strata traversed by the device.

Instead of utilizing an antenna, I may also utilize an inductance coil as shown in Fig. 2. This coil S consists of a number of turns of insulated wire wound upon insulating, non-hygroscopic material M, and the two ends of this coil are connected in series with the oscillatory circuit I. The flow of high frequency currents through this coil develops magnetic lines of force which thread through the coil in the well-known manner. A portion of these lines of force, such as $u, u$ may run entirely within the bore hole. A considerable portion of these lines, such as $v$ and $w$ will take their outside path almost entirely through the adjacent stratum. If this stratum should contain an electrically conducting medium, eddy currents are produced in the medium which lower the effective self induction of coil S, and thus bring about a lowering of the frequency in circuit I. Besides, such a coil has an effect similar to that of an antenna, insofar as also electrostatic lines are formed similar to those shown in Fig. 1 which extend partly within the bore hole and partly through the adjacent stratum. If the latter is electrically conducting the capacity of this antenna-like structure will likewise bring about a lowering of the frequency of circuit I.

With both methods, therefore, the pure antenna method as shown in Fig. 1, and the coil method as shown in Fig. 2, the observed frequency variation may serve as an indicator of the medium character of the stratum adjacent to which the exploring device happens to be located. The use of an inductance coil has the advantage that its length may be only of the order of one meter, which is sufficient to bring about the desired effect by the adjacent stratum, while an antenna alone, such as is shown in Fig. 1 in order to be effective must be at least several meters in length.

In order to observe the frequency variations in circuit I above ground without conducting the high frequency currents themselves above ground, the following arrangement illustrated in Fig. 3 is provided.

The housing G is suspended from cable K which consists of a well insulated steel core wound above ground upon a cable drum by which the explorer device G can be lowered and raised in the bore hole. The construction of the cable drum is entirely immaterial for the present invention. Fig. 4 shows diagrammatically such a cable drum 35 which may be provided with a slip ring 36 to which the inner end 34 of the cable is connected, and on which a brush 37 may slide by which the currents traversing the cable K can be conducted to the receiving device above ground. In Fig. 3 in which the cable drum has been omitted, the cable is electrically connected to a key U which is part of the receiving device above ground, and by which normally the currents flowing through the cable are connected to the primary winding $pr$ of a transformer $Tr_3$. The other end of this primary winding is grounded as shown. The secondary winding of this transformer is connected to a two-stage tube amplifier device $V_1$, $Tr_4$ and $V_2$ in which the received currents are amplified in the conventional manner, and then delivered to a double telephone T, T in which the frequency variations are aurally observed. In the explorer housing G is arranged the high frequency oscillatory circuit I consisting of a three-electrode tube 3, an inductance 20, and the condenser 11, and including further the feed back coil 21, and the feed back condenser 22, all in the conventional circuit arrangement of a high frequency tube generator. The cathode of the tube is heated by means of a low-volt storage battery 1, and the anode current of 100 volts is furnished by a dry cell battery 2. Both batteries may be disposed for instance in the upper portion of housing G as shown.

In housing G is further located a second high frequency oscillatory circuit II whose frequency slightly differs from that generated by circuit I. Circuit II consists of a three-electrode tube 5, condenser 24, inductance coil 23, feed back coil 25, and feed back condenser 26. Circuits I and II are coupled together by means of coupling coils 4, 4 of a few turns each. The beat frequency current which is produced by these two oscillatory circuits is transmitted by way of a transformer 6 to the grid of the beat frequency amplifier tube 7 which in turn transmits the amplified current by way of a transformer 8, and cable K and key U to the telephone amplifier above ground.

The insulated antenna A which is weighted at its end by a weight 10 protrudes vertically from the explorer device during the observations, and is connected by way of a series condenser 19 parallel to condenser 11 of oscillatory circuit I. Thus, the frequency of this circuit varies when the capacity of antenna A varies due to the change in character of the strata which the explorer device passes. This change in frequency produces a change in the beat frequency, and thus in the pitch of the tone observed in the telephones T, T.

In order to properly receive the tone in the telephone it is necessary that its pitch be within range of from 50 to 1,000 oscillations per second. If, due to the effect of the strata upon the antenna or upon inductance coil S—if the latter is used in place of the antenna as previously described—the frequency of circuit I should vary by more than about 1,000 oscillations per second, the tone in the telephone would become almost inaudibly weak. It is, therefore, advisable to make the oscillatory circuit I adjustable with respect to its frequency before the actual observation is made, but after the explorer device G has been lowered into the bore hole. For this purpose an adjustable condenser 12 is arranged in parallel to condenser 11 and to the antenna, the capacity of which can be varied by an electromagnetically operated ratchet and pawl mechanism 14 of conventional form. This mechanism is shown only symbolically at 14 in Fig. 1, and its connection with condenser 12 is shown by a dash line. The construction of this ratchet and pawl device is entirely immaterial. This adjusting device 14 is connected by way of conductor 14a, and cable K to the central pivot point of key U of the receiving device above ground. If now the operator should find the tone in the telephone too high or too low for convenient and exact operation, he can send successive current impulses from battery Q through cable K into the ratchet and pawl device 14 by depressing the left hand end of key U. At each current impulse the energizing coil of device 14 attracts its armature 14b, and thereby operates the ratchet one tooth ahead, and thus the condenser 12 is moved one step ahead. It thus becomes possible, after the apparatus has been lowered into the bore hole, by operating key U a number of times to adjust the beat frequency to such a value that the tone pitch produced by it in the telephone comes within a convenient range of audibility to secure reliable observations. If it is desired to not only aurally observe the variations in tone when the explorer device G traverses the different strata, but to also record such variations, the receiving device above ground may be supplemented by a recording device which is illustrated diagrammatically in Fig. 4.

When using such an additional recording device the beat frequency current transmitted through the cable K to the receiver above ground is conducted in series through the two primary coils pr of transformers 15 and 16 to ground. To the secondary winding of transformer 15 is connected the beat frequency amplifier device 17 which delivers the amplified beat frequency currents to the telephone T. Upon the current of the secondary winding of transformer 16 is superposed a third oscillatory circuit in which oscillations are produced in the same conventional manner as described hereinbefore by means of three-electrode tube 18. In this case it is advisable to choose the difference in frequency between oscillatory circuits I and II essentially higher than in case of the receiver arrangement shown in Fig. 3, namely so high that the first beat frequency current conducted above ground by cable K does not yet produce a distinctly audible tone in the telephone, so that when this first beat frequency is combined with the third, local frequency, a convenient audible tone will be produced. For instance, if within the variation of the antenna capacity during the observation the first beat frequency is adjusted to vary between 10,000 and 11,000 per second, the frequency of oscillatory circuit III should be adjusted to 9,900 per second, so that in the telephone T a tone frequency of from 100 to 1,100 per second is produced in order to afford convenient audibility. In order to record the variations in the antenna capacity the following additional device is provided as shown in Fig. 4. One of the constants of oscillatory circuit III, for instance condenser 19 is made adjustable by hand in such manner that the tone observed in telephone T during the passage of the detecting apparatus G through the different strata can always be maintained at the same pitch. This may be checked by the operator for instance through simultaneously observing a tuning fork of the proper pitch (not shown here). The adjustment of condenser 19, for maintaining this uniform pitch, is recorded on a continuously running paper strip in the following manner. The sprocket wheel 39 for moving the recording strip 40 is coupled in suitable speed relation with the shaft 38 which carries the cable drum 35. The speed relation between sprocket wheel 39 and the cable drum 35 may be for instance such that for each meter length which the cable is paid out or coiled up, the sprocket wheel, and thus the paper strip 40 advances by one centimeter. Across the paper strip 40 is disposed a rack 41 which carries at its left hand end a pencil 42, rack bar 41 being movable across the strip 40 by means of a pinion 43 which is coupled with a hand operated knob 44. This pinion is coupled by means of shaft 45 with the shaft of adjustable condenser 19, so that when the latter is adjusted to obtain the proper constancy of tone in the telephone as described, the adjustments are transversely recorded on paper strip 40, as shown in Fig. 4. These transverse variations form the ordinates of the continuous curve while the forward movement of the paper represents the abscissa. Thus, the different ordinates, when considered with respect to their position on the abscissa line and with the corresponding position of the explorer device G in the bore hole, represent each a particular response of the appertaining stratum which is properly interpretable from experience and through calibration of the apparatus.

While in the arrangements disclosed in Figs. 3 and 4 the operator particularly observes the frequency variations of an oscillatory circuit due to the variations in strata characteristics the arrangement according to Fig. 5 utilizes the variations in current intensity of a high frequency circuit due to the variations in strata characteristics. This current intensity variation is due to the variation in damping in case the electric characteristics of the adjacent strata should vary. In order to observe these variations in high frequency current intensity I propose to use a device responsive to these current variations and disposed within the explorer housing G, and which by itself delivers a current through cable K to a measuring instrument so that also in this case the transmission of high frequency currents through the cable is avoided.

As shown in Fig. 5 a high frequency current may be generated in a circuit arrangement similar to the high frequency source I in Fig. 3, and which includes a three-electrode tube 27, an inductance 28, condenser 29, and the detector coil S arranged similar to the manner shown with respect to Fig. 2. As the detector coil S traverses the different strata, and when the electromagnetic and electrostatic flux produced by the coil is varied by the different characteristics of the strata, more eddy current energy is consumed in the electrically better conducting strata, and thus the current intensity in the oscillatory circuit increases. Likewise, if the stratum traversed should have a higher dielectric constant than the previously traversed stratum, the capacity of coil 8 increases, and the current intensity in the oscillatory circuit likewise increases. These variations in current intensity in the oscillatory circuit are utilized for varying the output current of a thermo-couple R placed in cooperative relation with the oscillatory circuit within casing G. The current generated by this thermo-couple is conducted by way of the insulated cable K to a sensitive ammeter 30 located above ground, and the other terminal of which is conducted to ground by way of a ground plate 31. Thus, by reading the indications of the ammeter 30 the observer can recognize the greater or lesser conductivities or the higher or lower dielectric constants of the traversed strata, and from known calibrations draw conclusions with respect to the character of the medium contained in each particular stratum. The thermo-couple R may either be directly connected into the oscillatory circuit or may be merely associated with it in such manner that the varying temperatures produced by the high frequency current properly affect the thermo-couple. These details are well-known in the high frequency art, and are therefore not illustrated specifically in the drawings. The last-mentioned indirect heating method has the advantage that all possibility of high frequency current leakage through the cable, and thus possible impairments of the observations are avoided.

It is obvious from the preceding description that in each modification described and shown certain elements may be exchanged with those of the other modification. For instance the inductance coil S may in any of the modifications shown replace the antenna and vice versa the antenna A may replace the inductance coil without limiting the scope of the present invention.

It is also obvious that other suitable recording methods may be employed in place of the one shown in Fig. 4 to obtain the desired results.

It is further obvious that the exercise of my invention is not confined to the particular form of the exploring inductance coil S shown in Figs. 2 and 5. For instance, as shown in Fig. 6, the exploring inductance S suspended from explorer casing G may have the form of a rectangular frame, of a width nearly equal the diameter of the bore hole, and a length at least equal to the width, but preferably much greater. The proper relation of these dimensions may be easily experimentally ascertained and may vary according to the geologic conditions. This inductance S may contain as many turns of wire as are necessary to serve as one of the constants of high frequency oscillatory I Fig. 2, to which it is connected, and in which it serves in the same capacity as inductance coil S in that figure. As shown in Fig. 6, with a rectangular coil magnetic lines of force are set up around its longitudinal shanks a, a, a few of which lines such as u, u take their outside paths within the bore hole, while the greater majority of the lines such as v, w take their outside paths through the adjacent stratum with the same effect upon the coil and its associated high frequency oscillatory circuit as described with reference to the remaining figures.

I claim:

1. Method of exploring characteristic differences between different geologic strata traversed by a bore hole, consisting in moving a generator of high frequency oscillations and an appertaining radiator of a high frequency field of force through the bore hole to successively expose each stratum individually to the field of force produced by said radiator, locally converting the different electric reactive effects, produced upon said generator by the different reactions of said field to the different strata characteristics, into correspondingly varying electric forces non-reactive upon said high frequency generator, transmitting said electric forces from the different points of exploration to the point of observation, and there observing the variation of said forces as a measure of the varying character of the traversed strata.

2. Method of exploring characteristic differences between different geologic strata traversed by a bore hole, consisting in moving a generator of high frequency oscillations and an appertaining radiator of a high frequency field of force through the bore hole to successively expose each stratum individually to the field of force produced by said radiator, generating at the point of exploration second oscillations of a constant frequency slightly different from and superposed upon the first-mentioned high frequency oscillations to locally produce beat frequency currents, transmitting said beat frequency currents to the point of observation, and there observing the variation in frequency of said beat currents due to variation in frequency of said first-named generator, produced by the different reactions of said field to the different strata characteristics, as a measure of the varying character of the traversed strata.

3. Method of exploring characteristic differences between different geologic strata traversed by a bore hole, consisting in moving a generator of high frequency oscillations and an appertaining radiator of a high frequency field of force through the bore hole to successively expose each stratum individually to the field of force produced by said radiator, generating at the point of exploration second oscillations of a constant frequency slightly different from and superposed upon the first-mentioned high frequency oscillations to locally produce audible beat frequency currents, transmitting said beat frequency currents to the point of observation, and there observing the variation in frequency of said beat currents due to variation in frequency of said first-named generator, produced by the different reactions of said field to the different strata characteristics, as a measure of the varying character of the traversed strata.

4. Method of exploring characteristic differences between different geologic strata traversed by a bore hole, consisting in moving a generator of high frequency oscillations and an antenna connected therewith through the bore hole to successively expose each stratum individually to the electrostatic field of force produced by said antenna, locally converting the different electric reactive effects, produced upon said generator by the different reactions of said field to the different strata characteristics, into correspondingly varying electric forces non-reactive upon said high frequency generator, transmitting said electric forces from the different points of exploration to the point of observation, and there observing the variation of said forces as a measure of the varying character of the traversed strata.

5. Method of exploring characteristic differences between different geologic strata traversed by a bore hole, consisting in moving a generator of high frequency oscillations including a high frequency inductance coil through the bore hole to successively expose each stratum individually to the electromagnetic field of force produced by said coil, locally converting the different electric reactive effects, produced upon said generator by the different reaction of said field to the different strata characteristics, into correspondingly varying electric forces non-reactive upon said high frequency generator, transmitting said electric forces from the different points of exploration to the point of observation, and there observing the variation of said forces as a measure of the varying character of the traversed strata.

6. Method of exploring characteristic differences between different geologic strata traversed by a bore hole, consisting in moving a generator of high frequency oscillations and an appertaining radiator of a high frequency field of force through the bore hole to successively expose each stratum individually to the field of force produced by said radiator, generating at the point of exploration second oscillations of a constant frequency slightly different from and superposed upon the first-mentioned high frequency oscillations, to locally produce beat frequency currents due to the variation in frequency of said first-named generator, produced by the different reactions of said field to the different strata characteristics, transmitting said beat frequency currents to the point of observation, superposing at said point a third, variable frequency current upon said beat frequency currents to produce secondary, audible beat frequency currents, aurally observing said latter currents, varying the frequency of said third currents to produce with the varying primary beat frequency currents always the same secondary beat frequency, and recording the variations in adjustment of said third frequency currents as a measure for the varying character of the traversed strata.

7. Method of exploring characteristic differences between different geologic strata traversed by a bore hole, consisting in moving a generator of high frequency oscillations and an appertaining radiator of a high frequency field of force through the bore hole to successively expose each stratum individually to the field of force produced by said radiator, locally generating by the different current intensity effects, produced in said generator by the different reactions of said field to the different strata characteristics, correspondingly varying electromotive forces, transmitting the currents produced by said forces to the point of observation, and there observing the variation of said currents as a measure of the varying character of the traversed strata.

8. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, a radiator of a high frequency field of force connected to said generator and suspended from said casing for exposing the traversed strata individually to the field of force developed by said radiator, means in said casing for converting the different electric reactive effects, produced upon said generator by the different reactions of said field to the different strata characteristics, into correspondingly varying electric forces non-reactive upon said high frequency generator, said cable being adapted to transmit said forces to the point of observation, and means connected to said cable at said point, for observing the variation of said forces as a measure of the varying character of the strata traversed by said casing.

9. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, an insulated antenna connected to said generator and suspended from said casing for exposing the traversed strata individually to the electrostatic field developed by said antenna, means in said casing for converting the different electric reactive effects, produced upon said generator by the different reactions of said field to the different strata characteristics, into correspondingly varying electric forces non-reactive upon said high frequency generator, said cable being adapted to transmit said forces to the point of observation, and means connected to said cable at said point, for observing the variation of said forces as a measure of the varying character of the strata traversed by said casing.

10. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, an insulated inductance coil connected to said generator and suspended from said casing for exposing the traversed strata individually to the electromagnetic field developed by said coil, means in said casing for converting the different electric reactive effects, produced upon said generator by the different reactions of said field to the different strata characteristics, into correspondingly varying electric forces non-reactive upon said high frequency generator, said cable being adapted to transmit said forces to the point of observation, and means connected to said cable at said point, for observing the variation of said forces as a measure of the varying character of the strata traversed by said casing.

11. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, a radiator of a high frequency field of force connected to said generator and suspended from said casing for exposing the traversed strata individually to the field of force developed by said radiator, a second high frequency generator in said casing having a constant frequency slightly different from the frequency produced by the first-named generator, and being coupled with the latter to produce resulting beat frequency currents whose frequency varies in accordance with the frequency variations of the first generator due to the different electric reactive effects produced upon said generator by the different reactions of said field to the different strata characteristics, said cable being adapted to transmit said beat frequency currents to the point of observation, and means connected to said cable at said point for observing said beat frequency variations as a measure of the varying character of the strata traversed by said casing.

12. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, a radiator of a high frequency field of force connected to said generator and suspended from said casing for exposing the traversed strata individually to the field of force developed by said radiator, a second high frequency generator in said casing having a constant frequency slightly different from the frequency produced by the first-named generator, and being coupled with the latter to produce resulting beat frequency currents whose frequency varies in accordance with the frequency variations of the first generator due to the different electric reactive effects produced upon said generator by the different reactions of said field to the different strata characteristics, said cable being adapted to transmit said beat frequency currents to the point of observation, a third generator of oscillations disposed at said point of observation and having means for variably adjusting its frequency to slightly differ from the beat frequency transmitted by said cable to produce secondary, audible beat frequency currents, means for aurally observing said secondary beat frequency, means for operating the adjusting means of said third generator to maintain the observed beat frequency constant, and means for recording said adjustments in relation to the different positions of said casing in the bore hole, whereby the degree of each adjustment represents a measure of the character of the particular stratum for which the adjustment was made.

13. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, a radiator of a high frequency field of force connected to said generator and suspended from said casing for exposing the traversed strata individually to the field of force developed by said radiator, a second high frequency generator in said casing having a constant frequency slightly different from the frequency produced by the first-named generator, and being coupled with the latter to produce resulting beat frequency currents whose frequency varies in accordance with the frequency variations of the first generator due to the different electric reactive effects produced upon said generator by the different reactions of said field to the different strata characteristics, said cable being adapted to transmit said beat frequency currents to the point of observation, and means connected to said cable at said point for observing said beat frequency variations as a measure of the varying character of the strata traversed by said casing, an electrically operated means in said casing for adjusting the desired operating frequency of said first generator, and means at the point of observation, and connected by said cable to said adjusting means for sending adjusting impulses to said adjusting means.

14. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, a radiator of a high frequency field of force connected to said generator and suspended from said casing for exposing the traversed strata individually to the field of force developed by said radiator, a generator of variable electromotive forces in said casing operatively connected with said high frequency generator to respond to the varying intensities of the currents in said high frequency generator, produced by the different reactions of said field to the different strata characteristics, said cable being connected to said variable electromotive force generator for transmitting the currents produced by said generator to the point of observation, and means connected to said cable at said point, for observing the variation of the transmitted currents as a measure of the varying character of the strata traversed by said casing.

15. A device for exploring characteristic differences between different geologic strata traversed by a bore hole consisting of an explorer casing, an electrically conducting cable for supporting said casing and for permitting its travel through the bore hole and for conducting currents between said casing and the point of observation, a generator of high frequency oscillations disposed within said casing, a radiator of a high frequency field of force connected to said generator and suspended from said casing for exposing the traversed strata individually to the field of force developed by said radiator, a thermo couple in said casing operatively connected with said high frequency generator, to respond to the varying intensities of the currents in said high frequency generator, produced by the different reactions of said field to the different strata characteristics, said cable being connected to said thermo couple for transmitting the currents produced in it to the point of observation, and means connected to said cable at said point, for observing the variation of the transmitted currents as a measure of the varying character of the strata traversed by said casing.

OSCAR MARTIENSSEN.